(12) United States Patent
Tomoni (10) Patent No.: US 6,554,288 B2
(45) Date of Patent: Apr. 29, 2003

(54) COLLET ADAPTER

(76) Inventor: Carmel Tomoni, C.M. Machine Inc. 560 S. Grand Ave., San Jacinto, CA (US) 92582

( * ) Notice: Subject to any disclaimer, the term of this patent is extended or adjusted under 35 U.S.C. 154(b) by 0 days.

(21) Appl. No.: 09/949,486

(22) Filed: Sep. 7, 2001

(65) Prior Publication Data

US 2003/0047891 A1 Mar. 13, 2003

(51) Int. Cl.$^7$ .............................................. B23B 31/20
(52) U.S. Cl. ........................................ 279/51; 279/143
(58) Field of Search ................................ 279/143–145, 279/50, 51–53; 82/165, 142, 152

(56) References Cited

U.S. PATENT DOCUMENTS

| | | | | |
|---|---|---|---|---|
| 1,463,176 A | * | 9/1923 | Schieldge ...................... | 279/53 |
| 4,699,389 A | * | 10/1987 | Buck ............................. | 279/52 |
| 5,431,416 A | * | 7/1995 | Thornton ...................... | 279/51 |
| 5,615,590 A | * | 4/1997 | Speckhahn ................... | 279/143 |
| 5,806,859 A | * | 9/1998 | Saccomanno, III .......... | 279/143 |
| 6,149,357 A | * | 11/2000 | Skellon ........................ | 409/225 |

FOREIGN PATENT DOCUMENTS

| | | | | |
|---|---|---|---|---|
| WO | WO-88/07904 A1 | * | 10/1988 | ................... 279/143 |
| WO | WO-00/13069 A1 | * | 3/2000 | ............ B23B/31/20 |

OTHER PUBLICATIONS

Pages 86, 87, 88, 89, and 141 of the "US Shop Tools Machine Tools & Supplies" catalog published by US Shop Tools of Anaheim, California showing mounting fixtures and collets that are prior art relative to the instant application. Mar., 2001.

* cited by examiner

Primary Examiner—Steven C. Bishop
(74) Attorney, Agent, or Firm—Loyal McKinley Hanson (57) ABSTRACT

An adapter for facilitating use of a bullnose mounting fixture on the spindle of a unit of machining equipment with a collet having a collet head larger than the bullnose bore includes a collet-receiving component disposed symmetrically about an adapter rotational axis. An adapter bore through the collet-receiving component with the collet body so that the collet body fits coaxially into the adapter bore. A collet-head-receiving portion of the collet-receiving component defines a collet-head-receiving space having a size and shape that mates with the collet head so that the collet head fits coaxially into the collet-head-receiving space for purposes of enabling the collet-head-receiving portion to close the collet head against a workpiece. A sleeve extending axially from the collet-head-receiving portion mates with the bullnose bore for purposes of mounting the collet-receiving component on the bullnose in an operative position such that the collet-head-receiving portion is disposed ahead of the forward face of the bullnose and the bullnose rotational axis and the adapter rotational axis coincide. One embodiment includes a collar that fits over the forward end portion of the bullnose. A collet adapter assembly includes the adapter, a collet, and an adapter-nut-and-machine-screw combination for coupling the collet to the draw tube on the unit of machining equipment. A mounting fixture constructed according to the invention includes at least two screw holes in its forward end for use in screwing a collet-head-receiving component onto the forward face of the mounting fixture.

15 Claims, 11 Drawing Sheets

COLLET ADAPTER

BACKGROUND OF THE INVENTION

1. Technical Field

This invention relates generally to machining equipment, and more particularly to a collet adapter for adapting a collet to a mounting fixture having a bore with a bore forward bore entrance smaller than the head of the collet.

2. Description of Related Art

A collet is a workpiece-holding component that includes a collet head and a collet body. The collet head has multiple, circumferentially spaced, workpiece-gripping segments. The collet body fits into a collet-holding mounting fixture (herein called a "bullnose") that is bolted onto the rotatable spindle of a lathe or other unit of machining equipment. The combination of the bullnose and the collet is sometimes called a collet chuck.

The bullnose defines a bullnose bore into which the collet body fits, and a tapered bullnose bore wall at a tapered forward entrance to the bullnose bore that provides a bullnose cam surface facing the collet. After inserting the collet body into the bullnose bore and coupling the inward end of the collet body to a hydraulically powered, axially movable, activating linkage on the unit of machining equipment (sometimes called a "draw tube"), the machinist actuates the draw tube to further advance the collet body axially into the bullnose bore. As that occurs, a frusto-conically shaped circumference of the collet head (i.e., a collet cam surface) bears against the tapered bullnose bore wall (i.e., the bullnose cam surface). The resulting cam action closes the collet head against the workpiece, thereby to hold and rotate the workpiece for machining purposes.

Although this type of collet chuck works well in many instances, certain problems arise with a larger workpiece. In some cases, the workpiece is sufficiently large that the collet head is bigger than the entrance to the bullnose bore. So the collet is provided with a collet cam surface in the form of a frusto-conically shaped collet neck intermediate the collet head and the collet body. The tapered bullnose bore wall bears against the collet neck to close the collet head, instead of bearing against the circumference of the head. As a result, a lesser component of force is transmitted to the collet head and so the collet head does not close as tightly against the workpiece as the machinist may desire for a firm hold.

Of course, the machinist can maintain a set of bullnose components with different size bores. But that is an expensive alternative. Also, it involves the time and inconvenience of changing the bullnose. Thus, machinists need a better way to use a bullnose with a collet having a head larger than the entrance to the bullnose bore.

SUMMARY OF THE INVENTION

In line with the above, it is an object of this invention to overcome the foregoing and other disadvantages of prior art collet chucks. This object is achieved by providing a collet adapter for a collet having a collet head larger than the entrance to the bullnose bore. The collet adapter includes a hollow sleeve portion that fits into the bullnose bore and a collet-head-receiving portion that occupies a position ahead of the bore. A cam surface on the collet-head-receiving portion mates with the frusto-conically shaped circumference of a particular collet head for purposes of bearing against the collet head to close the collet. The machinist simply uses the collet adapter when the size of the workpiece dictates use of the larger collet head. A set of different size collet adapters enables use of just one bullnose for various collet head sizes.

To paraphrase some of the more precise language appearing in the claims, an adapter constructed according to the invention includes a collet-receiving component disposed symmetrically about an adapter rotational axis. It includes a collet-head-receiving portion and a sleeve portion, and it defines an adapter bore having a size that mates with the collet body so that the collet body fits coaxially into the adapter bore. The collet-head-receiving portion defines a collet-head-receiving space having a size and shape that mate with the collet head so that the collet head fits coaxially into the collet-head-receiving space for purposes of enabling the collet-head-receiving portion to close the collet head against a workpiece. The sleeve portion is centered on the adapter rotational axis and extends axially from the collet-head-receiving portion. It mates with the bullnose bore so that the sleeve portion fits coaxially into the bullnose bore. It functions as means for mounting the collet-receiving component on the bullnose in an operative position such that the collet-head-receiving portion is disposed ahead of the forward face of the bullnose and the bullnose rotational axis and the adapter rotational axis coincide.

A collet adapter assembly constructed according to the invention includes the adapter, a collet, and an adapter-nut-and-machine-screw combination for coupling the collet body to the draw tube on a unit of machining equipment. A mounting fixture constructed according to the invention includes at least two screw holes in its forward end for use in screwing a collet-head-receiving component onto the forward face of the mounting fixture.

Thus, the invention significantly facilitates use of a bullnose mounting fixture with a collet having a collet head larger than the forward entrance to the bullnose bore. The following illustrative drawings and detailed description make the foregoing and other objects, features, and advantages of the invention more apparent.

DESCRIPTION OF THE PREFERRED EMBODIMENTS

Figure 1:
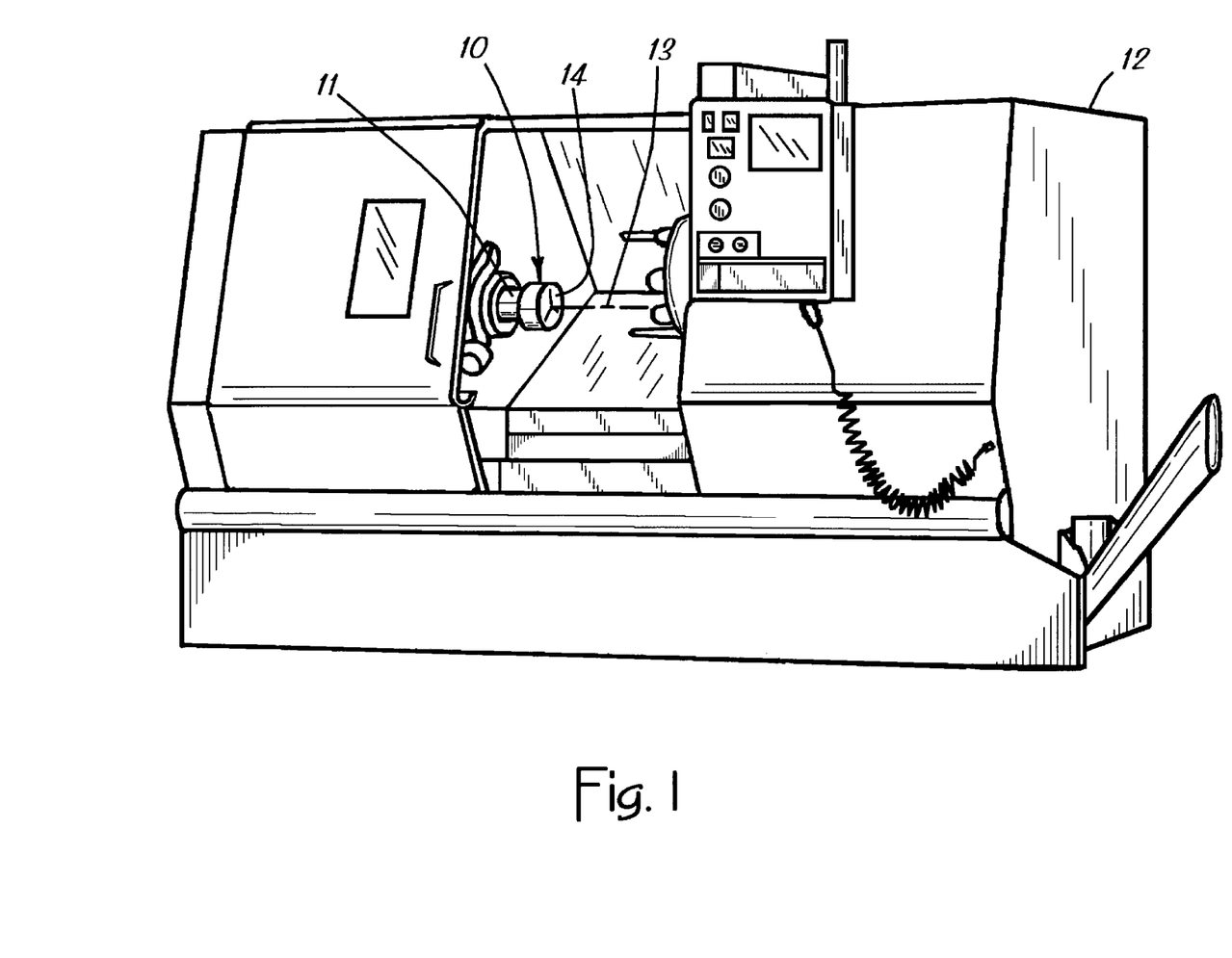
FIG. 1 of the drawings is an isometric view of a collet adapter constructed according to the invention shown installed on a bullnose that is mounted on the spindle of a unit of computer controlled machining equipment where it is holding a collet for rotation about a spindle rotational axis common to the spindle, the bullnose, the collet adapter, and the collet.

FIG. 1 of the drawings shows a collet adapter 10 constructed according to the invention. It is shown in FIG. 1 in its usual environment, mounted on a bullnose 11 of a lathe 12 (i.e., computer controlled machining equipment) for rotation about a spindle rotational axis 13 that passes centrally through the collet adapter 10, the bullnose 11, and a collet 14 held by the collet adapter 10. The lathe 12 represents any of various kinds and types of machining equipment that utilizes a bullnose mounting fixture in combination with a collet to hold and rotate a workpiece (e.g., the computer numeric control lathes available from Haas Automation, Inc. of Oxnard, Calif.). The collet adapter 10 of this invention facilitates use of the bullnose 11 on the lathe 12 with the larger collets needed for larger work pieces.

Figure 2:
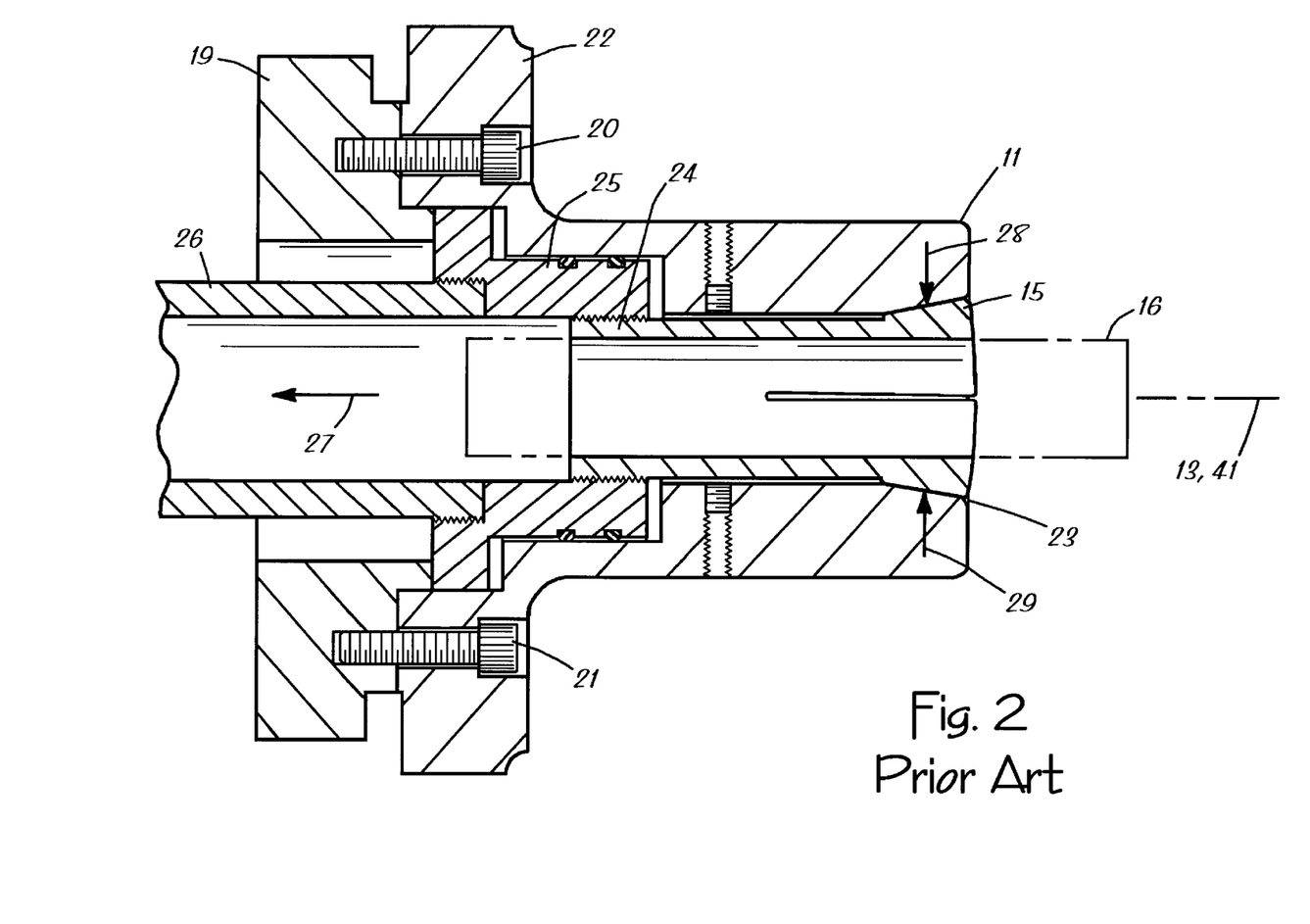
FIG. 2 is an enlarged cross sectional view of a small prior art collet installed on the bullnose where it is holding a tubular workpiece, as viewed in a plane containing the spindle rotational axis.
Figure 3:
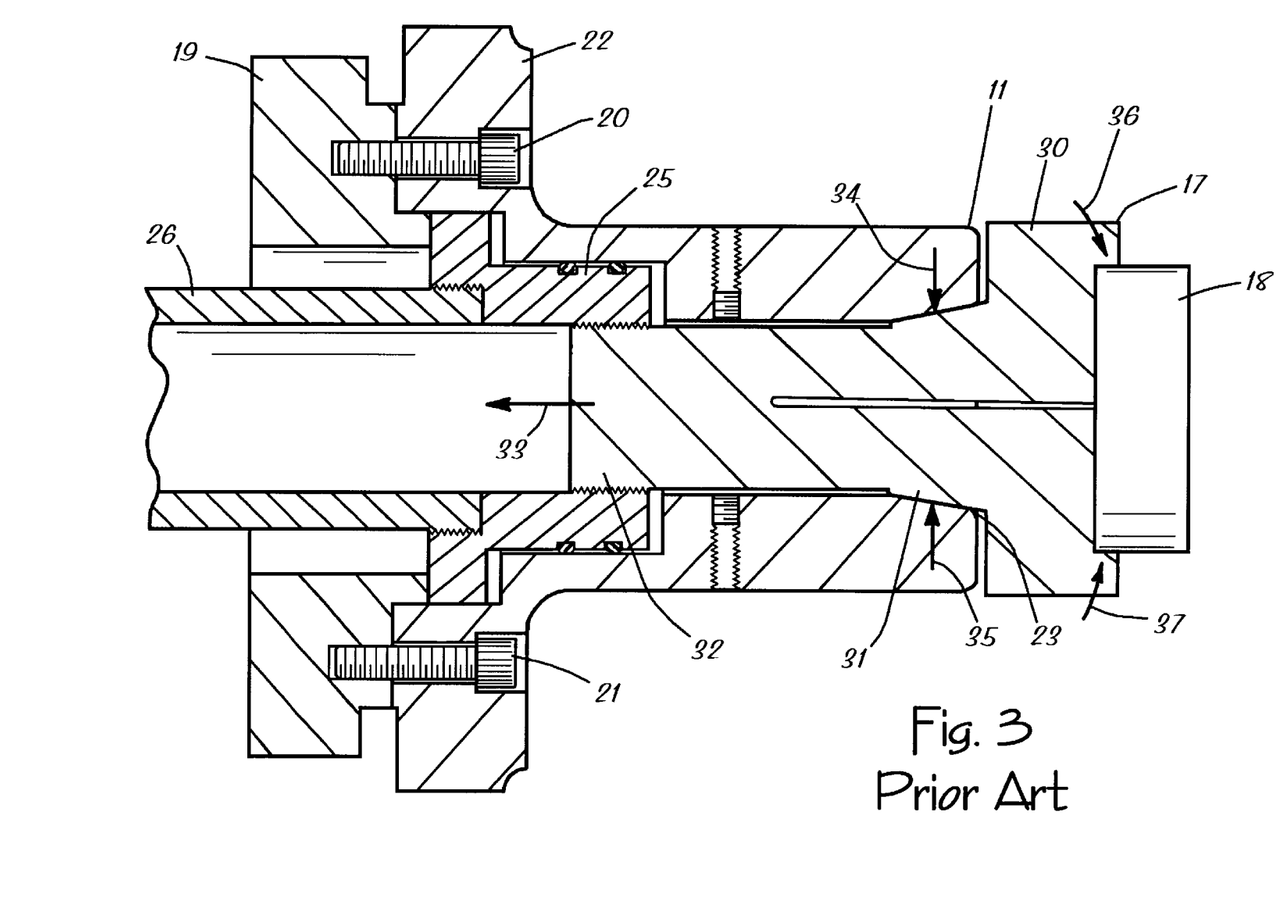
FIG. 3 is a cross sectional view of a larger prior art collet installed on the bullnose where it is holding a larger workpiece, as viewed in a plane containing the spindle rotational axis.

FIGS. 2 and 3 illustrate further details of the bullnose 11 as it is used with a small prior art collet 15 holding a tubular workpiece 16 shown in phantom lines (FIG. 2) and with a larger prior art collet 17 holding a larger non-tubular workpiece 18 (FIG. 3). First consider FIG. 2. The lathe 12 includes a spindle flange 19 onto which the bullnose 11 is mounted (i.e., bolted) with socket head machine screws 20 and 21 through a bullnose flange 22 for rotation with the spindle flange 19 about the spindle rotational axis 13. The bullnose 11 represents any of various kinds and types of bullnose mounting fixtures that work with a collet to form a collet chuck, including those available from US Shop Tools of Anaheim, Calif. It defines a bullnose bore that extends axially to a bullnose bore entrance 23 into which the head of the prior art collet 15 fits. An exteriorly threaded rearward end 24 of the body of the smaller prior art collet 15 mates with an interiorly threaded coupler component 25 on a draw tube 26. Actuating the draw tube 26 so that it moves axially as depicted by an arrow 27 in FIG. 2, pulls the collet 15 so that a tapered bullnose bore wall (a bullnose cam surface) at the bullnose bore entrance 23 bears radially inward against the head of the collet 15 as depicted by arrows 28 and 29 to close the collet 15 against the workpiece 16.

FIG. 3 illustrates the bullnose 11 in use with the larger prior art collet 17 that has a custom pocket machined into it to hold the larger workpiece 18. Like the smaller prior art collet 15, the larger prior art collet 17 is fabricated from soft metal so that it can be closed against the workpiece. However, the collet 17 has a head 30 that does not fit into the bullnose bore entrance 23. Instead, a neck portion 31 of the collet 17 defines a frusto-conically shaped cam surface that mates with the bullnose cam surface at the bore entrance 23. It is frusto-conically shaped in the sense that it has a shape similar to the tapered exterior annular surface of a fustrum of a cone, a fustrum of a cone being that portion of a cone between the base of the cone and a plane passing through the cone parallel to the base. As with the collet 15, an exteriorly threaded body 32 of the collet 17 mates with the coupler component 25. Actuating the draw tube 26 so that it moves axially as depicted by an arrow 33 in FIG. 2, pulls the collet 17 so that the bullnose cam surface bears against the neck portion 31 of the collet 17 as depicted by arrows 34 and 35. That cam action transmits a component of force to the collet head 30 as depicted by arrows 36 and 37 to close the collet 17 against the workpiece 18. As mentioned previously, the problem is that the lesser component of force transmitted to the collet head 30 does not close the collet head 30 as tightly against the workpiece 18 as the machinist may desire for a firm hold.

Figure 4:
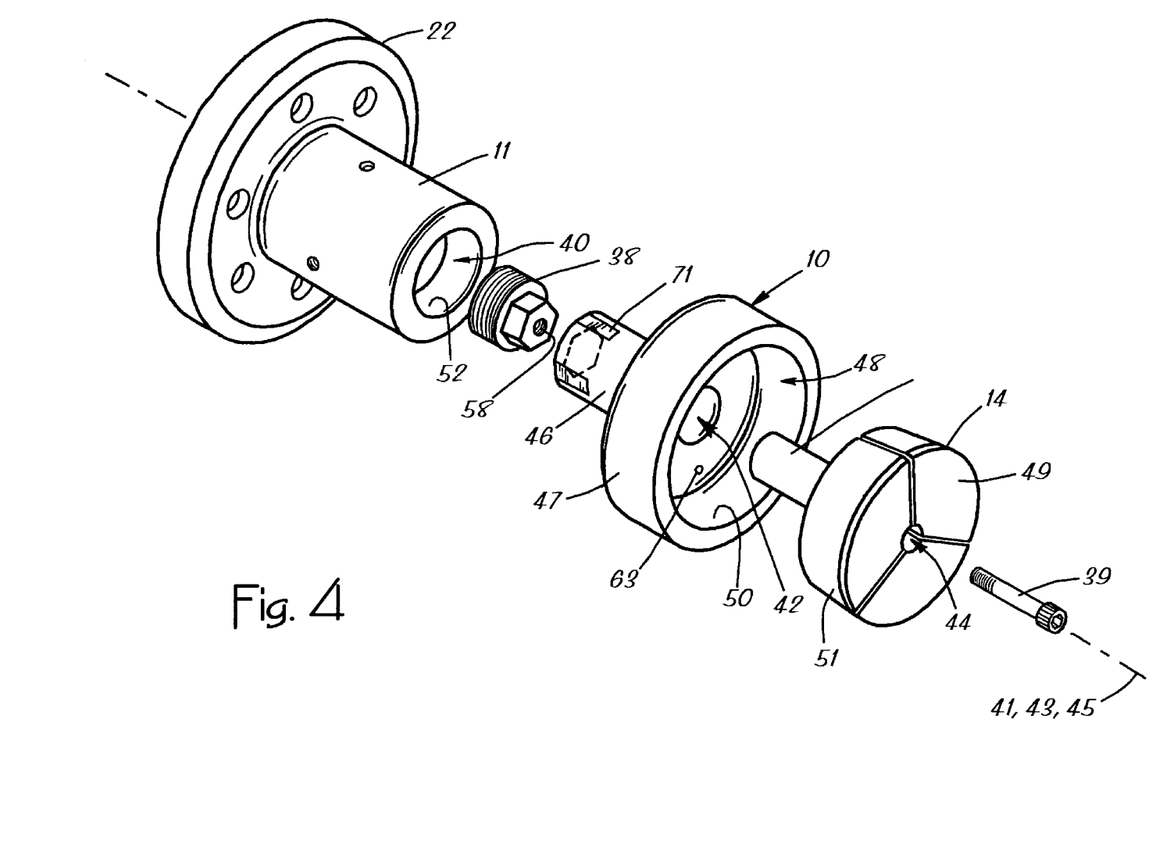
FIG. 4 is an enlarged disassembled view of the adapter of the present invention and associated components, showing a soft collet with a large collet head, the collet adapter, the adapter nut, and the machine screw aligned with the bullnose rotational axis.

The collet adapter 10 overcomes the problem. FIG. 4 shows it along with the collet 14, an adapter nut 38, and a machine screw 39 that the machinist assembles in the order shown to form a collet adapter assembly. The bullnose 11 defines a bullnose bore 40 centered on a bullnose rotational axis 41, the collet adapter 10 defines an adapter bore 42 centered on an adapter rotational axis 43, and the collet 14 defines a collet bore 44 centered on a collet rotational axis 45. With the components fully assembled and positioned in the bullnose bore 40, the rotational axes 41, 43, and 45 coincide.

Whereas the collet 14 is a soft collet fabricated from a soft metal (e.g., 12L14 steel screw stock) that can be machined to receive a workpiece and closed against the workpiece, the collet adapter 10 is a hollow sleeve composed of a hard metal (e.g., 4130 steel). The hollow sleeve includes a cylindrically shaped sleeve portion 46 that fits coaxially within the bullnose bore 40 with the adapter nut 38 attached to the sleeve portion 46 by the machine screw 39. The collet adapter 10 also includes a collet-head-receiving portion 47 that defines a frusto-conically shaped space 48 into which a collet head 49 of the collet 14 fits. The space 48 is bounded circumferentially by a frusto-conically shaped adapter cam surface 50 that mates with a frusto-conically shaped circumference 51 of the collet head 49. Thus, the collet adapter 10 enables the collet head 49 to be closed by cam action against the circumference 51 of the collet head 49 even though the collet head 49 does not fit into the bullnose bore 40. A frusto-conically shaped bullnose cam surface 52 on the bullnose 11 is used to center the sleeve portion 46 instead of closing the collet head 49.

Figure 5:
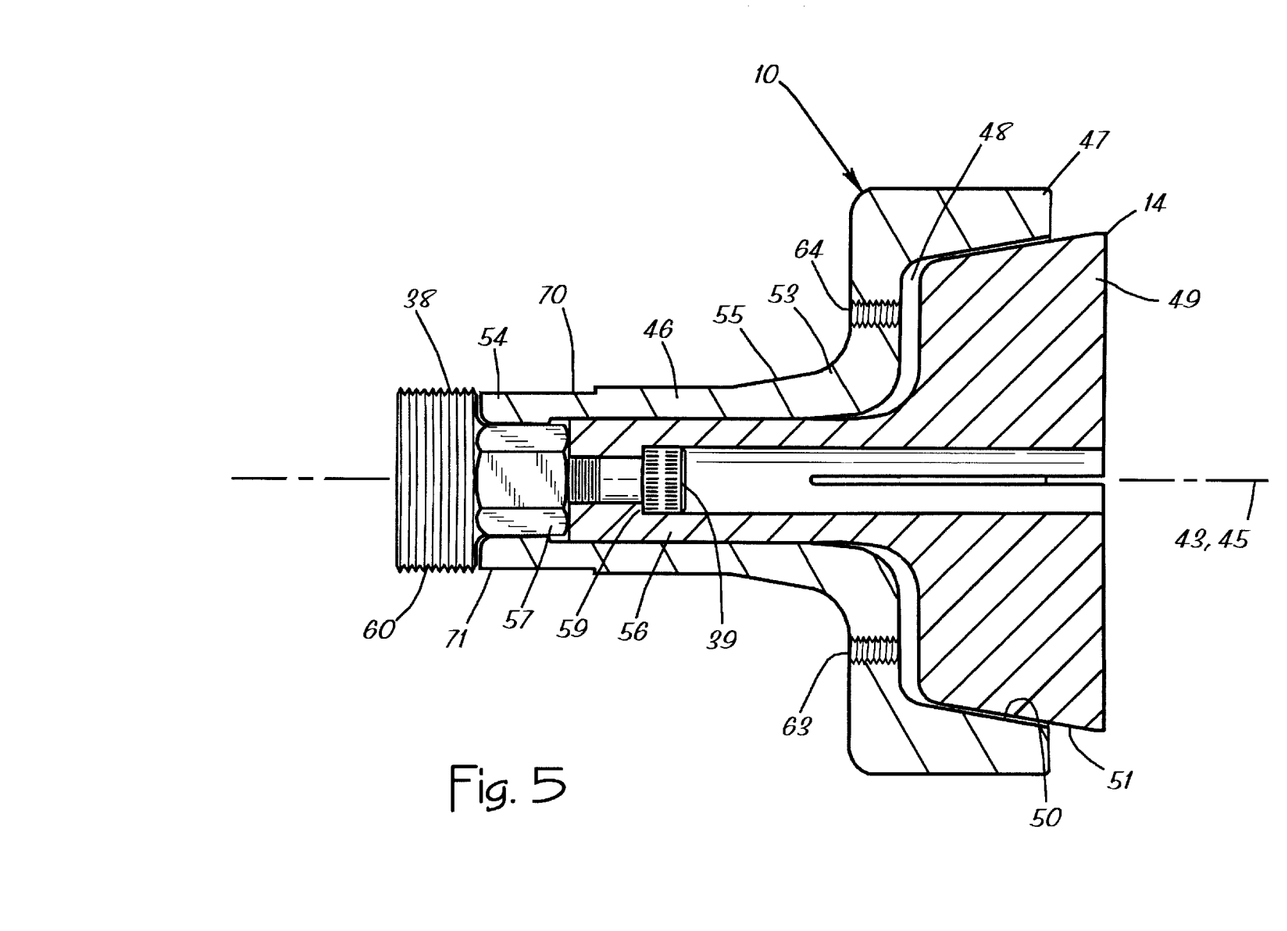
FIG. 5 is an enlarged view of the collet adapter assembly apart from the bullnose.

FIG. 5 shows further details about the centering aspect of the collet adapter 10 with the collet adapter and associated components fully assembled as a collet adapter assembly. The sleeve portion 46 of the collet adapter 10 extends axially along the adapter rotational axis 43 between a first end 53 of the sleeve portion 46 at the collet-head-receiving portion 47, and a second end 54 of the sleeve portion 46 that fits coaxially within the bullnose bore 40. The sleeve portion 46 has a tapered exterior portion 55 (e.g., a 10-degree taper narrowing axially to about a 1.89-inch diameter) at the first end 53 that mates with the bullnose cam surface 52 identified in FIG. 4 (i.e., the tapered forward end portion of the bullnose bore 40). That enables a person to seat the sleeve portion 46 within the tapered forward end portion of the bullnose bore 40 for purposes of aligning the adapter rotational axis 43 with the bullnose rotational axis 41 and to limit axial movement of the sleeve portion 46 within the bullnose bore 40. The sleeve portion 46 has a length between the first and second ends 53 and 54 sufficient (e.g., about 3.75 inches) to extend into the bullnose bore beyond the tapered forward end portion (i.e., the bullnose cam surface 52) of the bullnose bore 40. Of course, the length of a collet adapter constructed according to the invention is dependent upon the dimensions of the bullnose with which it will be used.

FIG. 5 also illustrates the adapter nut 38 attached to a collet body portion 56 of the collet 14 with the machine screw 39. The collet body portion 56 is a cylindrically shaped body that fits coaxially into the adapter bore 42, and the adapter nut 38 includes a hexagonally shaped portion 57 that also fits coaxially within a similarly shaped portion of the adapter bore 42 at the second end 54 of the sleeve portion 46. The hexagonally shaped portion 57 includes a threaded bore 58 (FIG. 4) that mates with and receives the machine screw 39, with the head of the machine screw 39 bearing axially against a radially inward protruding shoulder 59 in the collet bore 44. The adapter nut 38 also includes an exteriorly threaded portion 60 that mates with the interiorly threaded coupler component 25 on the draw tube 26 discussed previously. This arrangement enables the machinist to remove the collet 14 when desired (e.g., to change collets) without removing the collet adapter 10 from the bullnose 11. The machinist simply removes the machine screw 39 and withdraws the collet 14 from the adapter bore 42, instead of having to dislodge the collet adapter 10. When the machinist does desire to remove the collet adapter 10 from the bullnose 11, he advances two screws 61 and 62 (FIGS. 6 and 7) within two threaded holes 63 and 64 (FIG. 5) that extend through the collet-receiving-head portion 47 parallel to the adapter axis 43 in diametrically opposite positions. The threaded hole 63 is also identified in FIG. 4. Advancing the screws 61 and 62 causes them to bear axially against a forward face 65 of the bullnose 11 (FIG. 6) and that helps dislodge the collet adapter 10.

As a further idea of size, the illustrated collet adapter 10 measures about 5.75 inches long axially, and the collet-receiving-head portion 47 has an outside diameter of about 6.0 inches so that the space 48 is large enough to receive a collet head measuring about 5.0 inches in diameter. Of course, those dimensions may vary significantly within the scope of the claims and without departing from the inventive concepts disclosed. Collet adapter size varies according to sizes of the bullnose and the collet head it is being used with. The machinist preferably keeps a set of collet adapters for various sizes of collets (e.g., collet adapters for collet heads measuring from about two to five inches in outside diameter).

Figure 6:
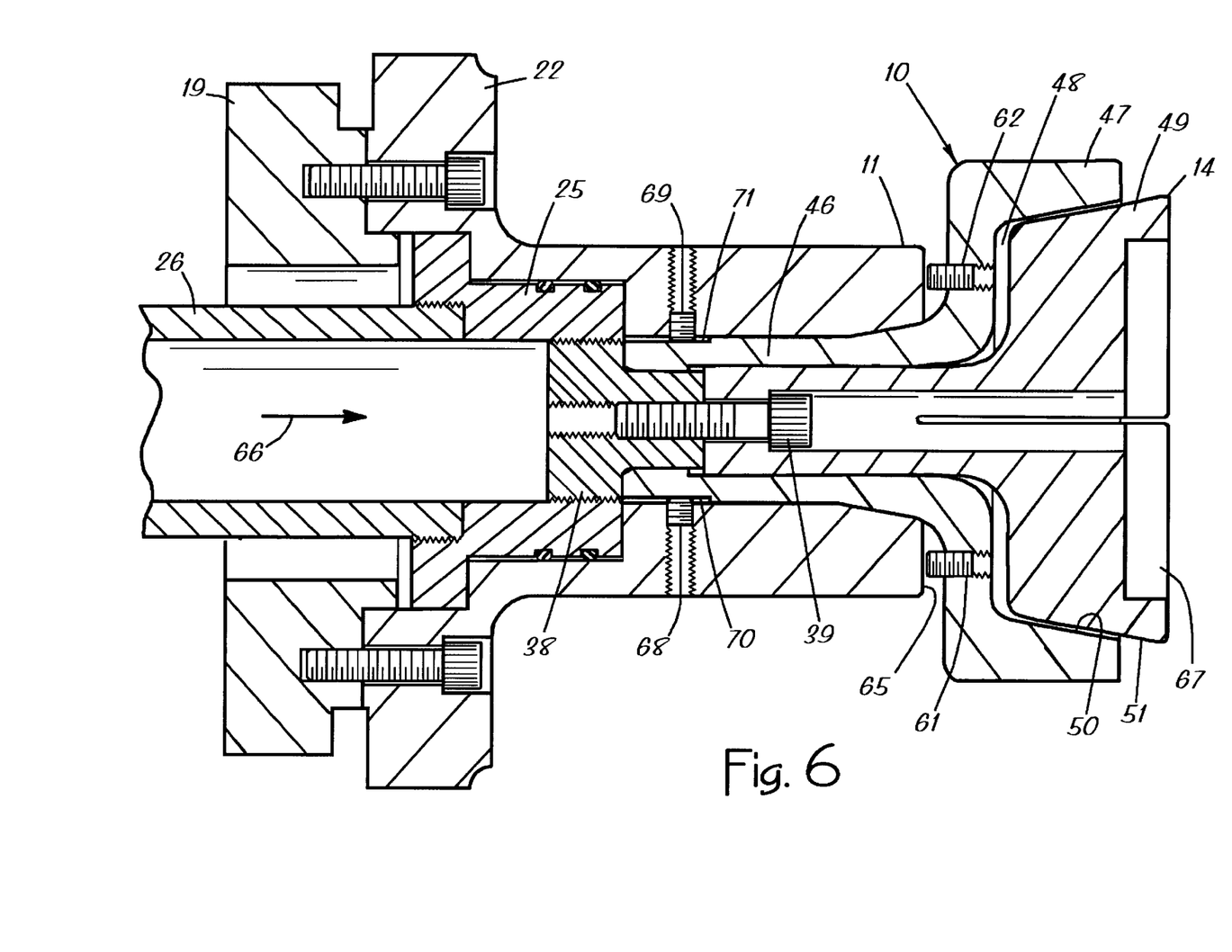
FIG. 6 is an enlarged cross sectional view of the collet adapter assembly installed on the bullnose as viewed in a plane containing the spindle rotational axis, showing the draw tube in its forward position so that the collet head is not compressed by the cam surface on the collet adapter.

FIG. 6 shows the collet adapter 10 installed on the bullnose 11 along with the collet 14, the adapter nut 38, and the machine screw 39. The draw tube 26 is shown moved to its forward position as depicted by an arrow 66 so that the collet 14 is held loosely within the space 48 of the collet-head-receiving portion 47. The adapter cam surface 50 does not bear against the circumference 51 of the collet head 49 and so the collet head 49 is not closed so that the machinist is able to place a workpiece in a custom-made pocket 67 (a workpiece-holding space) that he has machined into the collet head 49. Anti-rotation set screws 68 and 69 are shown advanced into contact with key ways 70 and 71 on the sleeve portion 46 of the collet adapter 10 in order to prevent rotation of the collet adapter 10 relative to the bullnose 11. There may be four anti-rotation screws and four key ways at ninety degree intervals (not shown), depending on the precise design. The key ways 70 and 71 are also identified in FIG. 5, and the key way 71 is identified in FIG. 4.

Figure 7:
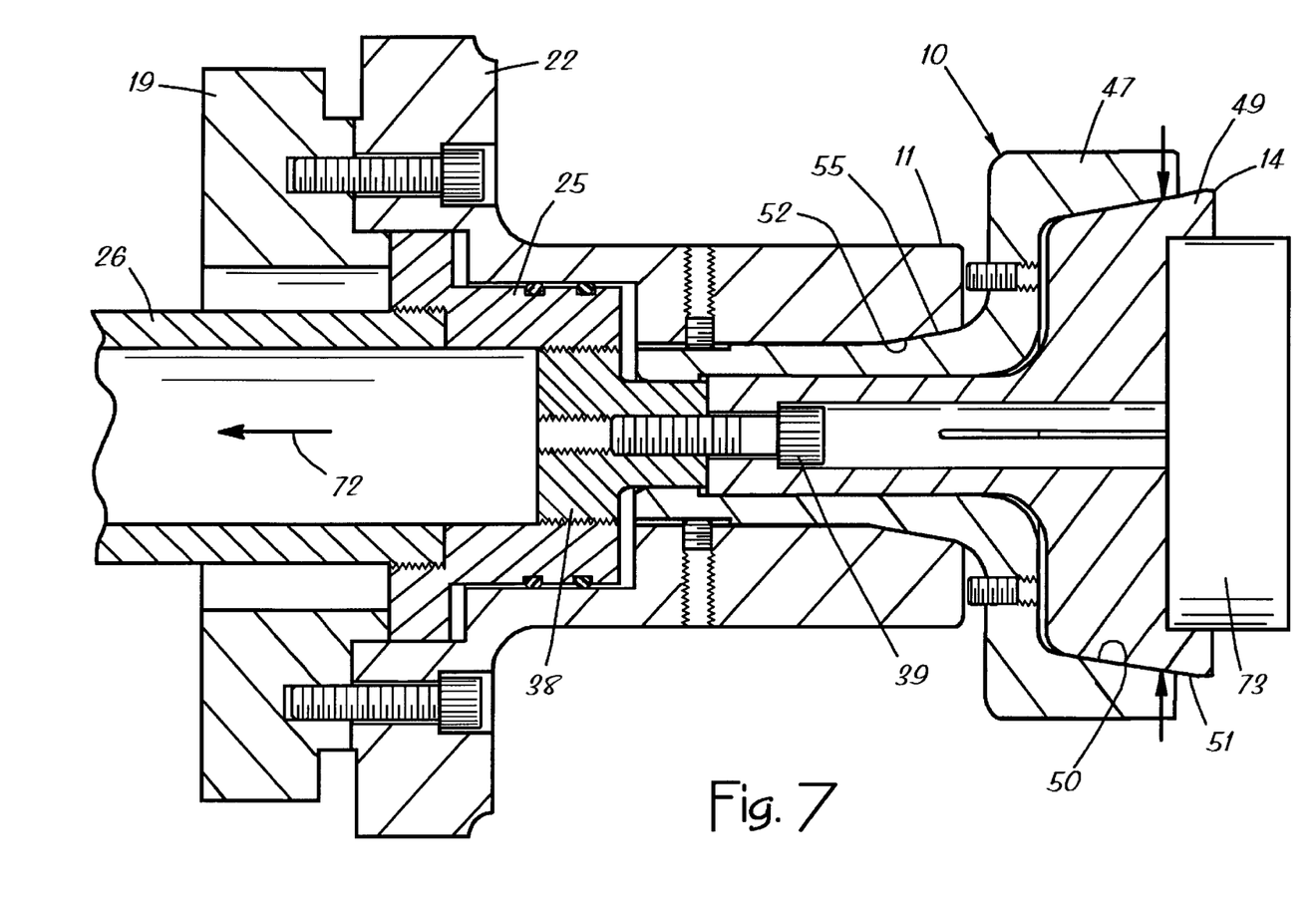
FIG. 7 is an enlarged cross sectional view similar to FIG. 6, showing the draw tube in its rearward position so that the collet head is compressed by the adapter cam surface on the collet adapter.

FIG. 7 is an enlarged cross sectional view similar to FIG. 6, showing the draw tube 26 in its rearward position. As the machinist actuates the draw tube 26 to moved it to its rearward position (as depicted by an arrow 72), the adapter bearing surface 50 bears against the frusto-conically shaped circumference 51 of the collet head 49. That cam action closes the collet head 49 against a workpiece 73 that the machinist placed in the pocket 67 (identified in FIG. 6) while the draw tube was in its forward position.

Figure 8:
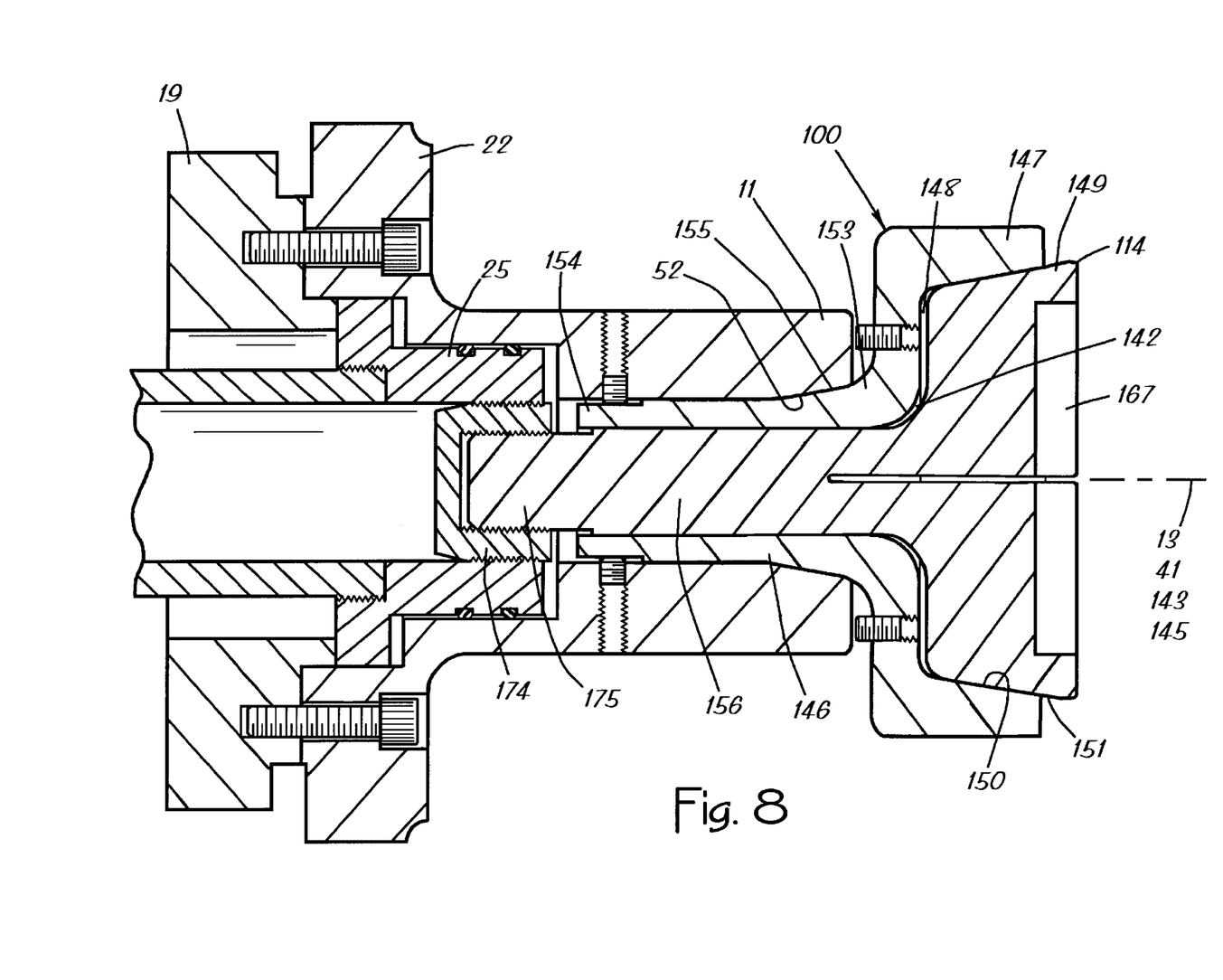
FIG. 8 is an enlarged cross-sectional view that is similar in some respects to FIG. 7, showing a second embodiment of a collet adapter constructed according to the invention in combination with a different arrangement for coupling the collet to the draw tube.

FIG. 8 shows a second embodiment of the invention in the form of a collet adapter 100 that combines with a soft collet 114 and threaded insert 174 to form a second collet adapter assembly. The collet adapter 100 is similar in many respects to the collet adapter 10 and so only differences are described in further detail. For convenience, reference numerals designating parts of the collet adapter 100 are increased by one hundred over those designating similar or related parts of the collet adapter 10.

Similar to the collet adapter 10, the collet adapter 100 takes the form of a collet-receiving body that defines an adapter bore 142 centered on an adapter rotational axis 143, and it includes a collet-head-receiving portion 147 that defines a space 148. The collet 114 has a collet head 149 and a collet body 156 that are both centered on a collet rotational axis 145, and the collet head 149 fits coaxially into the space 148. The collet-head-receiving portion 147 includes a frusto-conically shaped surface 150 (i.e., an adapter cam surface) that mates with a frusto-conically shaped circumference 151 of the collet head 149. A pocket 167 machined into the collet head 149 receives a workpiece (not shown). In addition, the collet-receiving body includes a sleeve portion 146 that is centered on the adapter rotational axis 143. It extends between a first end 153 at the collet-head-receiving portion 147 and a second end 154 of the sleeve portion 146 that fits coaxially within the bullnose bore. A frusto-conically shaped surface 155 of the sleeve portion 146 mates with the bullnose cam surface 52 so that the sleeve portion 146 seats securely within the bullnose bore. With these components assembled and inserted in the bullnose bore, the spindle rotational axis 13, the bullnose rotational axis 41, the adapter rotational axis 143, and the collet rotational axis 145 coincide.

Unlike the collet adapter 10, however, the collet adapter 100 does not have a hexagonally shaped portion for receiving a hexagonally shaped portion of an adapter nut. The sleeve portion 146 is designed instead to allow the collet body 156 to extend fully through it and into threaded engagement of the threaded insert 174. The threaded insert 174 includes an exterior thread that mates with the interiorly threaded coupler component 25. The threaded insert 174 also includes an interior thread that mates with an exteriorly threaded portion 175 of the collet body 156. This arrangement avoids having to screw an adapter nut onto the end of the collet 114.

Figure 9:
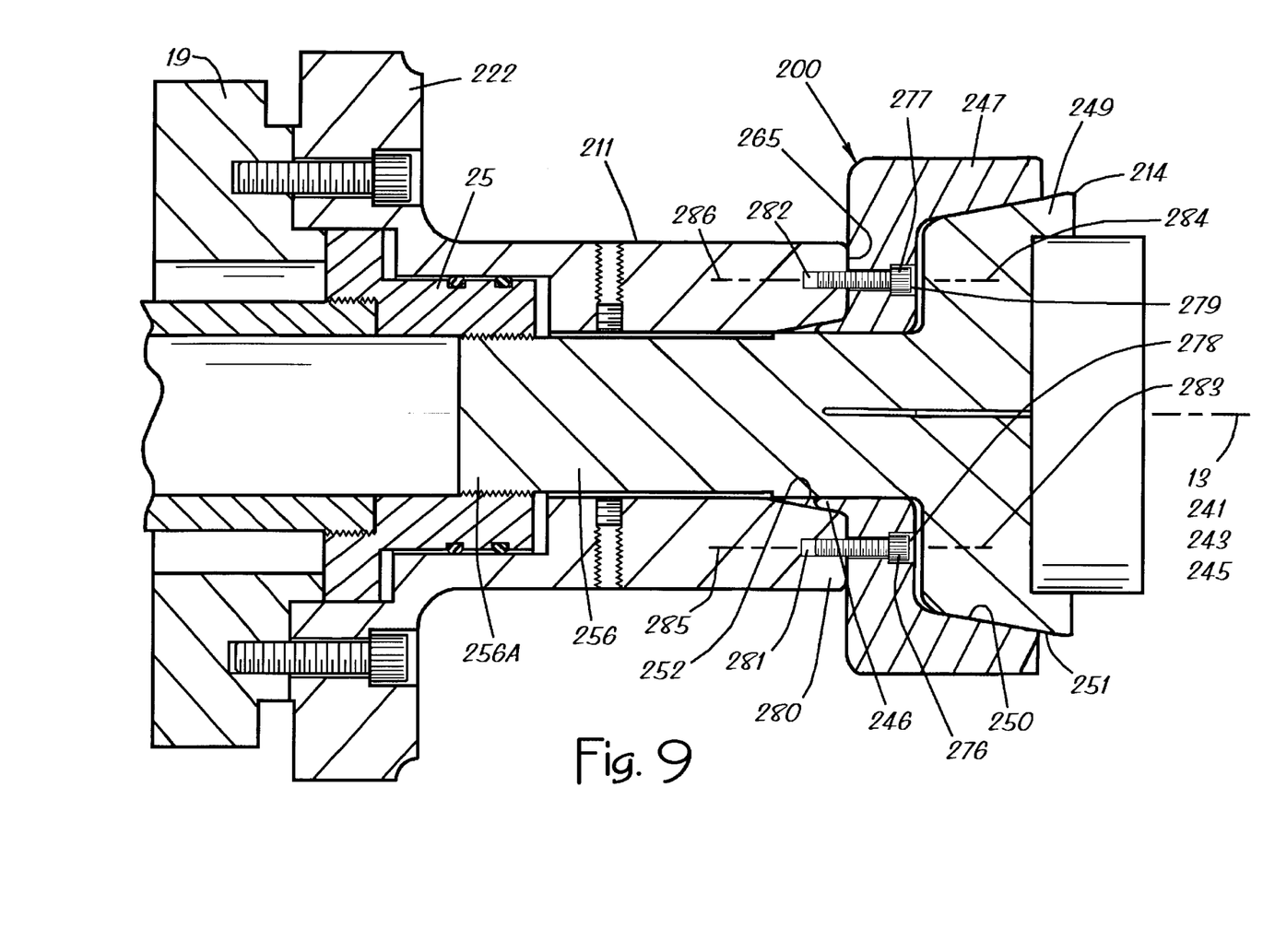
FIG. 9 is an enlarged cross-sectional view that is similar in some respects to FIG. 7, showing a third embodiment of the invention having a different style sleeve portion of the collet adapter.
Figure 10:
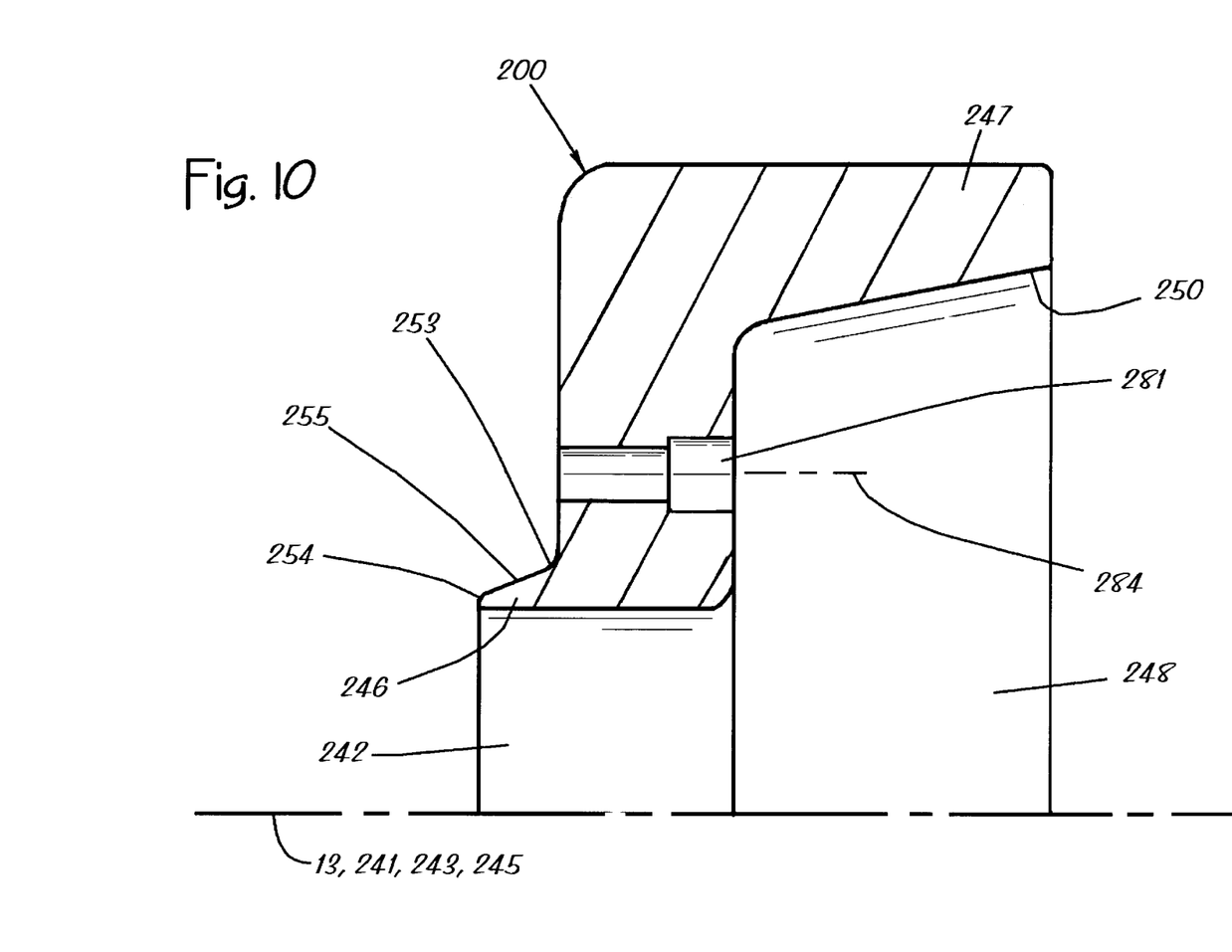
FIG. 10 is a further enlarged cross sectional view of a portion of the collet adapter shown in FIG. 9.

FIGS. 9 and 10 show a third embodiment of the invention in the form of a collet adapter 200 that combines with a soft collet 214 and first and second machine screws 276 and 277 to form a third collet adapter assembly that mounts on a bullnose 211 that also falls within the scope of the claims. The collet adapter 200 is similar in many respects to the collet adapters already described and so only differences are described in further detail. For convenience, reference numerals designating parts of the collet adapter 200 are increased by hundred over those designating similar or related parts of the collet adapter 10.

Similar to the collet adapter 10, the collet adapter 200 takes the form of a collet-receiving body that defines an adapter bore 242 (FIG. 10) centered on an adapter rotational axis 243, and it includes a collet-head-receiving portion 247 that defines a space 248. The collet 214 has a collet head 249 and a collet body 256 that are both centered on a collet rotational axis 245, and the collet head 249 fits coaxially into the space 248. The collet-head-receiving portion 247 includes a frusto-conically shaped surface 250 (i.e., an adapter cam surface) that mates with a frusto-conically shaped circumference 251 of the collet head 249. In addition, the collet-receiving body includes a sleeve portion 246 that is centered on the adapter rotational axis 243. It extends between a first end 253 at the collet-head-receiving portion 247 and a second end 254 of the sleeve portion 246 that fits coaxially within the bullnose bore. A frusto-conically shaped surface 255 on the sleeve portion 246 mates with a bullnose cam surface 252 of the bullnose 211 so that the sleeve portion 246 seats securely within the bullnose bore. With these components assembled and inserted in the bullnose bore and a bullnose flange 222 mounted on the spindle 19, the spindle rotational axis 13, the bullnose rotational axis 241, the adapter rotational axis 243, and the collet rotational axis 245 coincide.

Unlike the collet adapter 10, however, the sleeve portion 246 of the collet adapter 200 does not have a length sufficient to extend into the bullnose bore beyond the tapered forward end portion, the bullnose cam surface 252. As a result, the adapter bore 242 (FIG. 10) can be larger enough to receive a radially larger collet body 256 having an exteriorly threaded end portion 256 screws directly into the interiorly threaded coupler component 25 without further adaptation. The sleeve portion 246 still helps as means for mounting the collet adapter 200 on the bullnose 211 in an operative position such that the collet-head-receiving portion 247 is disposed ahead of the forward face 265 of the bullnose 211 and the bullnose rotational axis 241 and the adapter rotational axis coincide 243.

The means for mounting the collet adapter 200 on the bullnose 211 also includes at least two screw holes 278 and 279 through the collet-head-receiving portion 247. The first machine screw 276 extends through the first screw hole 278 in the collet-head-receiving portion 247 into threaded engagement of a forward end portion 280 of the bullnose 211 within a first threaded hole 281 in the forward end portion 280. The second machine screw 277 extends through the second screw hole 279 in the collet-head-receiving portion 247 into threaded of the forward end portion 280 within a second threaded hole 282 in the forward end portion 280. The first and second screw holes 278 and 279 are centered on respective ones of first and second screw hole axes 283 and 284 that extend parallel to the adapter rotational axis 243. The first and second threaded holes in the bullnose 211 are centered on respective ones of first and second threaded hole axes 285 and 286 that extend parallel to the bullnose rotational axis 241. When the collet adapter 200 is mounted on the bullnose 211, the first and second screw hole axes 283 and 284 coincide with respective ones of the first and second threaded hole axes 285 and 286. Of course, more than two screw holes can be provided in the collet adapter 200 and more than two threaded holes can be provided in the bullnose 211 within the scope of the claims and without departing from the inventive concepts disclosed.

Figure 11:
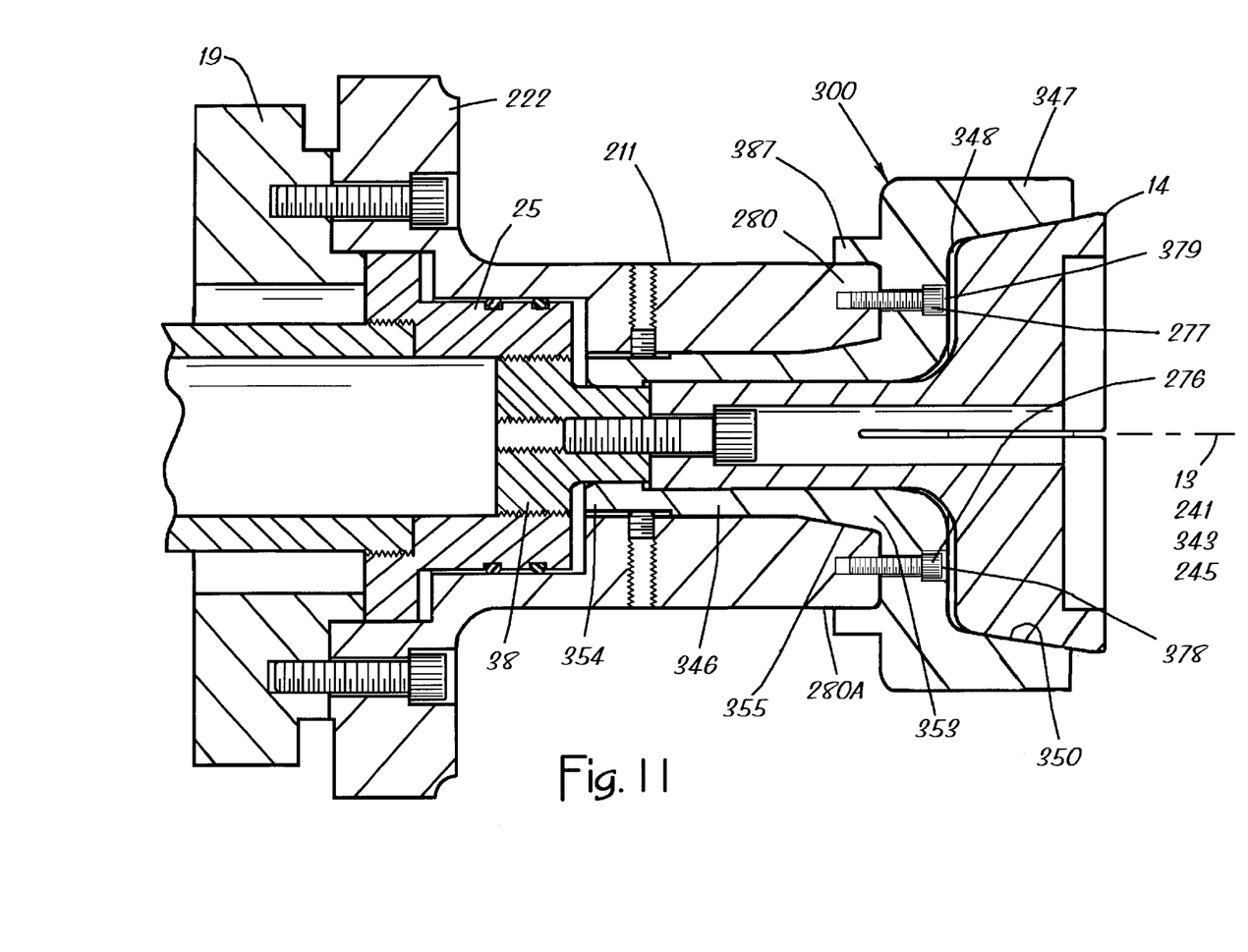
FIG. 11 is an enlarged cross sectional view similar to FIG. 7, showing a fourth embodiment of the invention having a collar that mates with the forward end portion of the bullnose.

Turning now to FIG. 11, it shows a fourth embodiment of the invention in the form of a collet adapter 300 that combines with the collet 14 and the first and second machine screws 276 and 277 to form a fourth collet adapter assembly. The collet adapter 300 is similar in many respects to the collet adapter 10 already described and so only differences are described in further detail. For convenience, reference numerals designating parts of the collet adapter 300 are increased by three hundred over those designating similar or related parts of the collet adapter 10.

Similar in some respects to the collet adapter 10, the collet adapter 300 takes the form of a collet-receiving body that defines an adapter bore 342 centered on an adapter rotational axis 343, and it includes a collet-head-receiving portion 347 that defines a space 348. The collet-head-receiving portion 347 includes a frusto-conically shaped surface 350 (i.e., an adapter cam surface) circumscribing the space 348 that mates with a frusto-conically shaped circumference 51 of the collet head portion 49 of the collet 14 identified in FIGS. 5–7. In addition, the collet-receiving body includes a sleeve portion 346 that is centered on the adapter rotational axis 343. It extends between a first end 353 at the collet-head-receiving portion 347 and a second end 354 of the sleeve portion 346 that fits coaxially within the bullnose bore. A frusto-conically shaped surface 355 on the sleeve portion 346 mates with the bullnose cam surface 252 of the bullnose 211 identified in FIG. 9 so that the sleeve portion 346 seats securely within the bullnose bore. With these components assembled and inserted in the bullnose bore, the spindle rotational axis 13, the bullnose rotational axis 241, the adapter rotational axis 343, and the collet rotational axis 45 coincide.

In addition, the collet adapter 300 includes at least two screw holes 378 and 379 through the collet-head-receiving portion 347 that are similar to the two screw holes 278 and 279 already described with reference to FIGS. 9 and 10. The machine screws 276 and 277 extend through the screw holes 378 and 379 into threaded engagement of the forward end portion 280 of the bullnose 211. Unlike the collet adapter 10, however, the collet adapter 300 includes a collar portion 387 that is centered on the adapter rotational axis 343. The collar portion 387 extends axially from the collet-head-receiving portion 347 to form an annular ring around a circumference 280A of the forward end portion 280. In other words, the collar portion 387 mates with the circumference 280A so the adapter rotational axis 343 and the bullnose rotational axis 241 coincide. With proper centering provided by the collar portion 387, the sleeve portion 346 may be omitted altogether within the scope of the claims.

Thus, the invention significantly facilitates use of a bullnose mounting fixture with a collet having a collet head larger than the forward entrance to the bullnose bore. The machinist simply uses the collet adapter when the size of the workpiece dictates use of the larger collet head. A set of different size collet adapters enables use of just one bullnose for various collet head sizes. Although exemplary embodiments have been shown and described, one of ordinary skill in the art may make many changes, modifications, and substitutions without necessarily departing from the spirit and scope of the invention.

What is claimed is:

1. An adapter that facilitates use of a collet with a bullnose when the collet has a collet body extending along a collet rotational axis to a collet head, the collet head has a circumference providing a collet cam surface, the bullnose defines a bullnose bore that extends along a bullnose rotational axis to a tapered forward end portion of the bullnose bore terminating at a forward face of the bullnose, and the circumference of the collet head is larger in radial dimension than the tapered forward end portion of the bullnose bore, the adapter comprising:

a collet-receiving component disposed symmetrically about an adapter rotational axis, which collet-receiving component defines an adapter bore having a size that mates with the collet body so that the collet body fits coaxially into the adapter bore;

a collet-head-receiving portion of the collet-receiving component that defines a collet-head-receiving space having a size and shape that mates with the collet head so that the collet head fits coaxially into the collet-head-receiving space, which collet-head-receiving portion includes an adapter cam surface bounding the collet-head-receiving space that mates with the collet cam surface in order to function as means for closing the collet head by cam action of the adapter cam surface against the collet cam surface as the collet head is advanced axially into the collet-head-receiving space for purposes of enabling the collet-head-receiving portion to close the collet head against a workpiece; and means for mounting the collet-receiving component on the bullnose in an operative position such that the collet-head-receiving portion is disposed ahead of the forward face of the bullnose and the bullnose rotational axis and the adapter rotational axis coincide;

wherein the means for mounting the collet-receiving component on the bullnose includes a sleeve portion of the collet-receiving component that is centered on the adapter rotational axis and extends axially from the collet-head-receiving portion, which sleeve portion mates with the bullnose bore so that the sleeve portion fits coaxially into the bullnose bore.

2. An adapter as recited in claim 1, wherein the sleeve portion has a length sufficient to extend into the bullnose bore beyond the tapered forward end portion of the bullnose bore.

3. An adapter as recited in claim 1, wherein the sleeve portion does not have a length sufficient to extend into the bullnose bore beyond the tapered forward end portion of the bullnose bore.

4. An adapter as recited in claim 1, wherein the means for mounting the collet-receiving component on the bullnose includes at least two screw holes through the collet-head-receiving portion for use in screwing the collet-head-receiving portion onto the forward portion of the bullnose.

5. An adapter as recited in claim 1, wherein the means for mounting the collet-receiving component on the bullnose includes a collar portion of the collet-receiving component that is centered on the adapter rotational axis and extends axially from the collet-head-receiving portion, which collar portion mates with an outer circumference of a forward portion of the bullnose so that the collar portion fits over the outer circumference.

6. An adapter assembly as recited in claim 1, wherein the collet-head-receiving portion defines at least two threaded through-holes extending through the collet-head-receiving portion parallel to the adapter rotational axis that are adapted to receive screws for a person to advance against the face of the bullnose for purposes of dislodging the collet adapter from the bullnose bore in order to facilitate removal of the collet adapter from the bullnose bore.

7. An adapter assembly that facilitates machining of a workpiece with a bullnose on a unit of machining equipment when the bullnose defines a bullnose bore that extends along a bullnose rotational axis to a tapered forward end portion of the bullnose bore terminating at a forward face of the bullnose and the workpiece is larger in radial dimension than the tapered forward end portion of the bullnose bore, the adapter assembly comprising:

a collet having a collet body extending along a collet rotational axis to a collet head, which collet head is larger in radial dimension than the workpiece and has a circumference providing a collet cam surface;

a collet-receiving component disposed symmetrically about an adapter rotational axis, which collet-receiving component defines an adapter bore having a size that mates with the collet body so that the collet body fits coaxially into the adapter bore;

a collet-head-receiving portion of the collet-receiving component that defines a collet-head-receiving space having a size and shape that mates with the collet head so that the collet head fits coaxially into the collet-head-receiving space, which collet-head-receiving portion includes an adapter cam surface bounding the collet-head-receiving space that mates with the collet cam surface in order to function as means for closing the collet head by cam action of the adapter cam surface against the collet cam surface as the collet head is advanced axially into the collet-head-receiving space for purposes of enabling the collet-head-receiving portion to close the collet head against a workpiece;

means for coupling the collet body to a draw bar on the unit of machining equipment; and means for mounting the collet-receiving component on the bullnose in an operative position such that the collet-head-receiving portion is disposed ah ad of the forward face of the bullnose and the bullnose rotational axis and the adapter rotational axis coincide;

wherein the means for mounting the collet-receiving component on the bullnose includes a sleeve portion of the collet-receiving component that is centered on the adapter rotational axis and extends axially from the collet-head-receiving portion, which sleeve portion mates with the bullnose bore so that the sleeve portion fits coaxially into the bullnose bore.

8. An adapter assembly as recited in claim 7, wherein the sleeve portion has a length sufficient to extend into the bullnose bore beyond the tapered forward end portion of the bullnose bore.

9. An adapter as recited in claim 7, wherein the sleeve portion does not have a length sufficient to extend into the bullnose bore beyond the tapered forward end portion of the bullnose bore.

10. An adapter as recited in claim 7, wherein the means for mounting the collet-receiving component on the bullnose includes at least two screw holes through the collet-head-receiving portion for use in screwing the collet-head-receiving portion onto the forward portion of the bullnose.

11. An adapter as recited in claim 7, wherein the means for mounting the collet-receiving component on the bullnose includes a collar portion of the collet-receiving component that is centered on the adapter rotational axis and extends axially from the collet-head-receiving portion, which collar portion mates with an outer circumference of a forward portion of the bullnose so that the collar portion fits over the outer circumference.

12. An adapter assembly as recited in claim 7, wherein the collet-head-receiving portion defines at least two threaded through-holes extending through the collet-head-receiving portion parallel to the adapter rotational axis that are adapted to receive screws for a person to advance against the face of the bullnose for purposes of dislodging the collet adapter from the bullnose bore in order to facilitate removal of the collet adapter from the bullnose bore.

13. An adapter assembly that facilitates machining of a workpiece with a bullnose on a unit of machining equipment when the bullnose defines a bullnose bore that extends along a bullnose rotational axis to a tapered forward end portion of the bullnose bore terminating at a forward face of the bullnose and the workpiece is larger in radial dimension than the tapered forward end portion of the bullnose bore, the adapter assembly comprising:

- a collet having a collet body extending along a collet rotational axis is to a collet head, which collet head is larger in radial dimension than the workpiece and has a circumference providing a collet cam surface;
- a collet-receiving component disposed symmetrically about an adapter rotational axis, which collet-receiving component defines an adapter bore having a size that mates with the collet body so that the collet body fits coaxially into the adapter bore;
- a collet-head-receiving portion of the collet-receiving component that defines a collet-head-receiving space having a size and shape that mates with the collet head so that the collet head fits coaxially into the collet-head-receiving space for purposes of enabling the collet-head-receiving portion to close the collet head against a workpiece;
- means for coupling the collet body to a draw bar on the unit of machining equipment; and
- means for mounting the collet-receiving component on the bullnose in an operative position such that the collet-head-receiving portion is disposed ahead of the forward face of the bullnose and the bullnose rotational axis and the adapter rotational axis coincide;
- wherein the means for mounting the collet-receiving component on the bullnose includes a sleeve portion of the collet-receiving component that is centered on the adapter rotational axis and extends axially from the collet-head-receiving portion, which sleeve portion mates with the bullnose bore so that the sleeve portion fits coaxially into the bullnose bore;
- wherein the sleeve portion includes a hexagonally shaped portion of the adapter bore that mates with a hexagonally shaped nut; and
- wherein the collet adapter includes an adapter nut for coupling the collet body to the draw tube, the adapter nut including an exteriorly threaded portion that mates with an interiorly threaded coupler on the draw tube, and a hexagonally shaped nut portion that fits within the hexagonally shaped portion of the adapter bore.

14. An adapter that facilitates use of a collet with a bullnose when the collet has a collet head with a circumference providing a collet cam surface and the bullnose defines a bullnose bore that extends along a bullnose rotational axis to a tapered forward end portion of the bullnose bore terminating at a forward face of the bullnose such that the circumference of the collet head is larger in radial dimension than the tapered forward end portion of the bullnose bore, the adapter comprising:

- a collet-receiving component disposed symmetrically about an adapter rotational axis;
- a collet-head-receiving portion of the collet-receiving component that defines a collet-head-receiving space having a size and shape that mates with the collet head so that the collet head fits coaxially into the collet-head-receiving space, which collet-head-receiving portion includes an adapter cam surface bounding the collet-head-receiving space that mates with the collet cam surface in order to function as means for closing the collet head by cam action of the adapter cam surface against the collet cam surface as the collet head is advanced axially into the collet-head-receiving space for purposes of enabling the collet-head-receiving portion to close the collet head against a workpiece; and
- means for mounting the collet-receiving component on the bullnose in an operative position such that the collet-head-receiving portion is disposed ahead of the forward face of the bullnose and the bullnose rotational axis and the adapter rotational axis coincide;
- wherein the means for mounting the collet-receiving component on the bullnose includes a collar portion of the collet-receiving component that is centered on the adapter rotational axis and extends axially from the collet-head-receiving portion, which collar portion mates with an outer circumference of a forward portion of the bullnose so that the collar portion fits over the outer circumference.

15. An adapter as recited in claim 14, wherein the means for mounting the collet-receiving component on the bullnose includes at least two screw holes through the collet-receiving component for use in screwing the collet-receiving component onto the forward portion of the bullnose.

* * * * *